United States Patent [19]

Nikolic et al.

[11] Patent Number: 5,786,748
[45] Date of Patent: Jul. 28, 1998

[54] METHOD AND APPARATUS FOR GIVING NOTIFICATION OF EXPRESS MAIL DELIVERY

[75] Inventors: John E. Nikolic, Pearl, Miss.; Patrick E. Burns, Palo Alto, Calif.

[73] Assignee: Mobile Telecommunications Technologies, Inc., Jackson, Miss.

[21] Appl. No.: 807,225

[22] Filed: Feb. 28, 1997

Related U.S. Application Data

[60] Provisional application No. 60/012,563, Feb. 29, 1996.
[51] Int. Cl.$^6$ .................................................. H04Q 7/00
[52] U.S. Cl. ........................... 340/311.1; 340/825.44; 340/313
[58] Field of Search .......................... 340/311.1, 825.44, 340/313

[56] References Cited

U.S. PATENT DOCUMENTS

| | | | |
|---|---|---|---|
| 4,940,963 | 7/1990 | Gutman et al. | 340/311.1 |
| 5,224,150 | 6/1993 | Neustein | 340/311.1 |
| 5,473,667 | 12/1995 | Neustein | 340/825.44 |
| 5,487,100 | 1/1996 | Kane | 340/825.44 |
| 5,635,918 | 6/1997 | Tett | 340/825.44 |

*Primary Examiner*—Edward Lefkowitz
*Attorney, Agent, or Firm*—Finnegan, Henderson, Farabow, Garrett & Dunner, L.L.P.

[57] ABSTRACT

To provide prompt notification of delivery of an express mailing to the addressee thereof, the page number of a person to be notified upon delivery of the express mailing is communicated to an express mail tracking network and to an operations center of a wireless paging service. When the paging operations center learns of the delivery, either from the tracking network or from a page message transmitted from the delivery site, the person to be notified is paged by the operations center.

3 Claims, 2 Drawing Sheets

METHOD AND APPARATUS FOR GIVING NOTIFICATION OF EXPRESS MAIL DELIVERY

This application has priority to Provisional Application 60/012,563 filed Feb. 29, 1996.

FIELD OF THE INVENTION

The present invention relates to telecommunications networks and particularly to a method and system for promptly notifying mailers of express mail deliveries.

BACKGROUND OF THE INVENTION

Express mail has grown to become a large industry involving numerous service providers, such as the U.S. Postal Service, Federal Express, UPS, and others. Federal Express, for example, has in place a network for tracking express mailings they have been engaged to carry. This tracking network is capable of indicating, on essentially a real time basis, status updates on every express mail package and envelope, i.e., its location, and, if delivered, the time and who signed for the delivery. Status updates are available to Federal Express mail users by calling an 800 telephone number. Federal Express also puts status updates out on the Worldwide Web, and thus this information is also accessible to users via the Internet. However, this tracking network requires action by persons, typically mailers, to determine whether critical express mailings have been successfully delivered to addressees.

SUMMARY OF THE INVENTION

It is accordingly an objective of the present invention to provide a method and system for giving prompt notifications to concerned parties of the actual delivery of express mailings to intended addressees.

To this end and in accordance with an embodiment of the present invention, there is provided a method for providing notification of an express mail delivery to an addressee thereof, comprising the steps of sending to an express mail tracking service an ID number assigned to an express mailing and a page number of a delivery notification recipient; relaying the ID and page numbers to a paging operations center; providing an indication to the paging operations center that the express mailing has been delivered to the addressee; and transmitting a wireless page message to the recipient as notification of the express mailing delivery.

Additional features and advantages of the invention will be set forth in the description that follows, and, in part, will be apparent from the description, or may be learned from practice of the invention. The objectives and other advantages of the invention will be realized and attained by the apparatus particularly pointed out in the written description and claims hereof, as well as the appended drawings.

It is to be understood that the foregoing general description and the following detailed description are exemplary and explanatory and are intended to provide further explanation of the invention defined in the appended claims.

BRIEF DESCRIPTION OF THE DRAWINGS

The accompanying drawings, which are incorporated in and constitute a part of this specification, illustrate embodiments of the invention and, together with the following detailed description, serve to explain the objectives, advantages, and principles of the invention.

In the drawings.

DETAILED DESCRIPTION OF PREFERRED EMBODIMENTS

Figure 1:
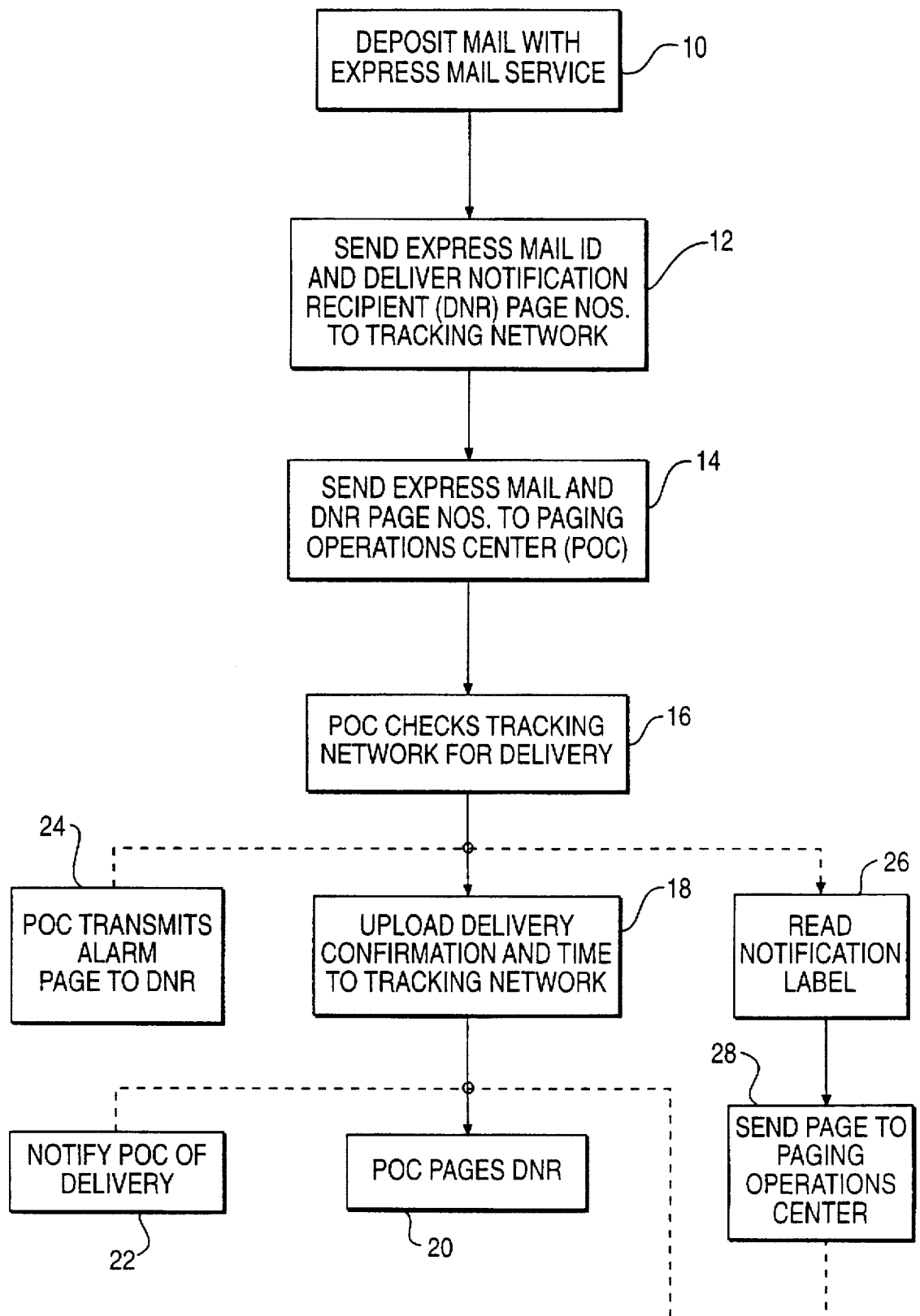
FIG. 1 is a flow chart illustrating various embodiments of the present invention.

In accordance with various embodiments of the method of the present invention illustrated in FIG. 1, a mailing party desiring to express mail a package or envelope goes to a terminal of an express mail service and indicates a need to be notified of the time of delivery of the express mailing to the addressed party (step 10). It will be appreciated that another concerned party(ies) may be designated as the delivery notification recipient. In accordance with a feature of the present invention, the delivery notification recipient(s) is designated by a page number assigned to the recipient as a subscriber to a paging service, such as, for example, Skytel, a global paging service provided by Mtel Technologies, Inc. of Jackson, Miss.

An ID number is assigned to the package or envelope by the express mail service and given to the mailing party. In addition, the express mail ID number and the delivery notification recipient's page number are communicated to the tracking network of the express mail service (step 12) via any suitable data link, e.g., land lines. The tracking network then notifies an operations center of the paging service that one of its subscribers, identified by page number, is to be paged when the express mailing, identified by its ID number, has been delivered (step 14). Commencing on the following day, the paging operations center periodically accesses the express mail tracking network to determine whether the particular express mailing has been delivered (step 16).

When the express mailing is delivered by a carrier of the express mail service to the addressee and signed for, this information, including time of delivery, is shortly thereafter uploaded into the express mail tracking network (step 18) via a suitable data link. Typically the express mail carrier is equipped with a portable data entry terminal including an optical scanner for reading a bar-coded label stuck to the express mailing to enter the express mail ID number. The delivery time and name of the signing party are manually entered via a keypad. Shortly thereafter, these entries are uploaded to the tracking network. Subsequently, when the paging operations center next accesses the tracking network (step 16) using the ID number, it is learned that this express mailing was delivered at a certain time; whereupon the paging operation center transmits a wireless page message to the delivery notification recipient's pager indicating delivery and time (step 20).

Rather than requiring the paging operations center to access the tracking network to determine that the express mailing has been delivered, the tracking network, upon receiving the delivery information uploaded from the carrier's terminal in step 18, may take the initiative and promptly notify the paging operations center of the delivery, as indicated by step 22. The paging operations center then executes step 20.

As an additional feature of the present invention, the paging operations center may transmit an alarm page message to the delivery notification recipient's pager (step 24), if the tracking network indicates that that express mailing has not been delivered by an appointed time. The appointed time may be included in the information sent to the paging operations center in step 14. The delivery notification recipient can then take appropriate action, such as accessing the tracking network to determine status, notifying the addressee, using alternative means to convey the express mailing contents to the addressee, etc.

As an alternative embodiment of the invention illustrated in FIG. 1, the express mail carrier may be equipped with a portable transmitting pager adapted to include a bar code reader. In this case, an additional bar code notification label indicating at least the express mail ID number, but possibly also the delivery notification recipient's page number, may be affixed to the express mail package or envelope in step 10. Then, when the express mailing is delivered, the carrier, in addition to entering the delivery information into the portable tracking terminal, reads the notification label (step 26) using the reader-pager. A page message including at least the express mail ID number is transmitted to the paging operations center (step 28), which then pages the deliver notification recipient in step 20. In this embodiment, step 16 can be omitted.

Figure 2:
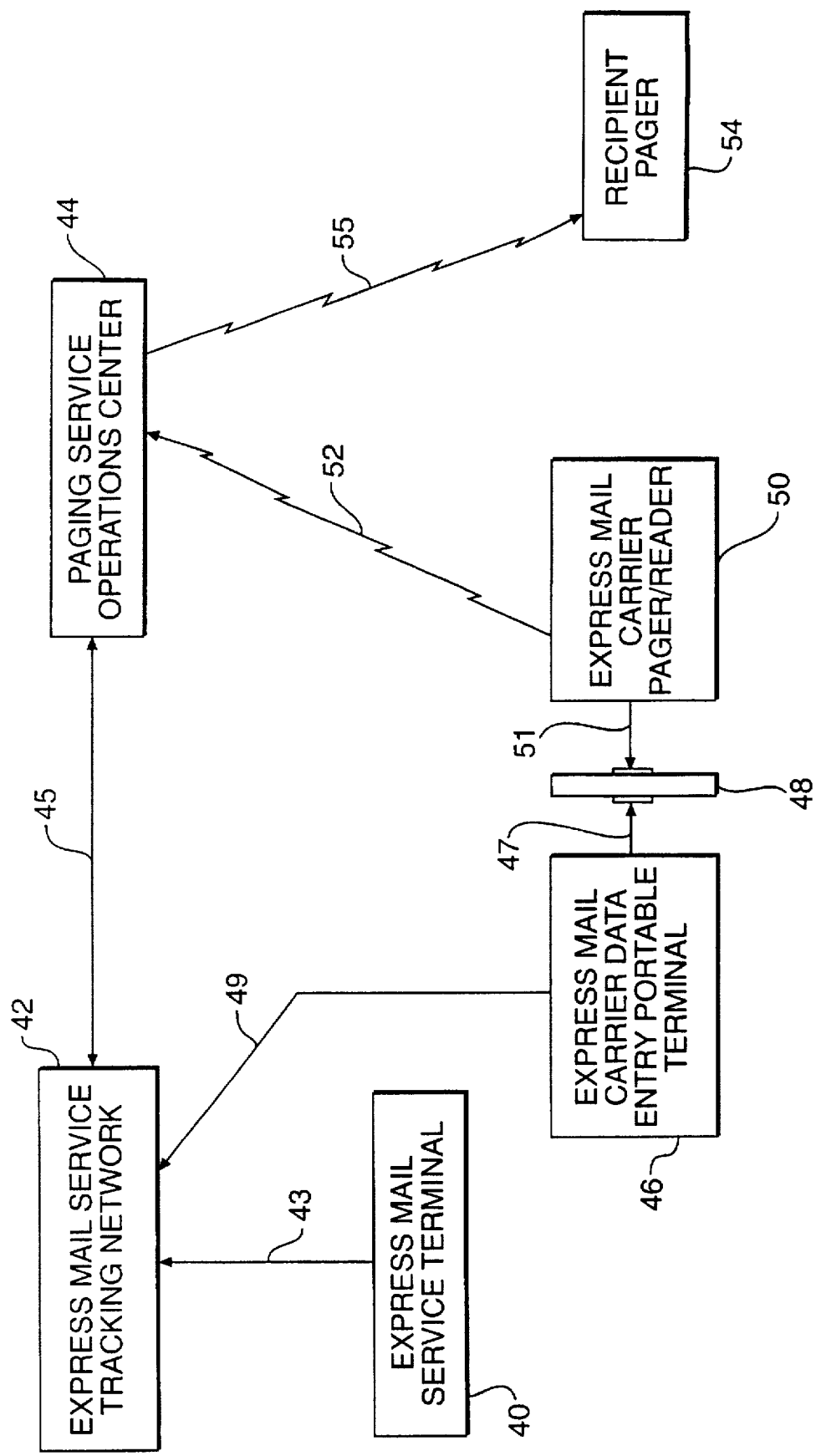
FIG. 2 is a block diagram of an exemplary system for practicing the various method embodiments of FIG. 1.

FIG. 2 provides a schematic block diagram of an exemplary system for practicing the various method embodiments of the invention illustrated in FIG. 1. Reference numeral 40 indicates an express mail service terminal where the various aspects of step 10 are performed. It will be appreciated that terminal 40 may, in fact, be the mailing party's office. The express mail ID number and delivery notification recipient's page number are communicated to the tracking network 42 over data link 43 and relayed to the paging operations center 44 over a data link 45. Reference numeral 46 indicates the express mail carrier's portable data entry terminal used to read (as indicated by arrow 47) the express mail bar-code label 47a stuck to the express mail envelope 48 to enter the express mail ID number, which soon thereafter is uploaded to tracking network 42 over data link 49. Reference numeral 50 represents a transmitting pager-reader for reading (as indicated by arrow 51) the delivery notification label 51a stuck to the package 48 and transmitting the read delivery notification information via a wireless data link 52 to paging operations center 44. Finally, reference numeral 54 represents the delivery notification recipient's pager which receives the delivery notification page via wireless data link 55.

Other embodiments of the invention will be apparent to those skilled in the art from consideration of the specification and practice of the invention disclosed herein. It is therefore intended that the specification and drawings be considered as exemplary only, with the true scope and spirit of the invention being indicated by the following claims.

What is claimed is:

1. A method for providing notification of an express mail delivery to an addressee thereof, comprising the steps of:

sending to an express mail tracking service an ID number assigned to an express mailing and a page number of a delivery notification recipient;

relaying the ID, page number, and an appointed time to a paging operations center;

providing a first indication to the paging operations center that the express mailing has been delivered to the addressee;

providing a second indication to the paging operations center that the express mailing has not been delivered to the addressee by the appointed time;

transmitting, responsive to the first indication, a wireless page message to the recipient as notification of the express mailing delivery; and transmitting, responsive to the second indication, a wireless page message to the recipient notifying recipient that the express mailing has not been delivered by the appointed time.

2. The method according to claim 1 wherein the step of transmitting a wireless page message responsive to the first indication includes the step of transmitting a wireless page message that indicates a time that the express mailing was delivered.

3. The method according to claim 1 wherein the step of transmitting a wireless page message responsive to the first indication includes the step of transmitting a wireless page message that indicates a name of a person that signed for the express mailing.

* * * * *